United States Patent [19]

Thomas, Sr.

[11] Patent Number: 5,160,020

[45] Date of Patent: Nov. 3, 1992

[54] DRIVE SYSTEM FOR ENDLESS BELT CONVEYORS WITH ROLLERS HAVING DRIVING, SUPPORTING AND ALIGNING FEATURES

[75] Inventor: James A. Thomas, Sr., Modesto, Calif.

[73] Assignee: Lindberg Corporation, Rosemont, Ill.

[21] Appl. No.: 612,072

[22] Filed: Nov. 9, 1990

[51] Int. Cl.⁵ .......................................... B65G 23/06
[52] U.S. Cl. ................................. 198/834; 198/835; 198/848; 474/155; 474/188
[58] Field of Search ............... 198/834, 835, 840, 843, 198/848; 474/155, 156, 157, 188

[56] References Cited

U.S. PATENT DOCUMENTS

| | | |
|---|---|---|
| Re. 30,341 | 7/1980 | Lapeyre .............. 198/834 |
| 1,354,553 | 10/1920 | Harter . |
| 1,854,506 | 4/1932 | Drake . |
| 1,861,840 | 6/1932 | Claghorn . |
| 1,930,584 | 10/1933 | Cope . |
| 2,000,499 | 5/1935 | Roland . |
| 2,413,339 | 12/1946 | Stadleman . |
| 2,524,328 | 10/1950 | Platt et al. .............. 198/848 X |
| 2,707,403 | 5/1955 | Thomson . |
| 2,859,861 | 11/1958 | Sheehan . |
| 2,885,164 | 5/1959 | Hooper . |
| 3,043,544 | 7/1962 | Hooper . |
| 3,069,121 | 12/1962 | Hooper . |
| 3,213,703 | 10/1965 | Fitzgerald . |
| 3,250,381 | 5/1966 | Hooper . |
| 3,362,239 | 1/1968 | Kaye et al. .............. 474/155 |
| 3,414,109 | 12/1968 | Clark . |
| 3,430,506 | 3/1969 | Stone . |
| 3,658,099 | 4/1972 | Daringer . |
| 3,812,732 | 5/1974 | Conrad . |
| 3,859,865 | 1/1975 | Conrad .............. 198/834 X |
| 3,888,131 | 6/1975 | Reid . |
| 3,961,736 | 6/1976 | Fatula . |
| 3,995,487 | 12/1976 | Locke . |
| 4,134,883 | 6/1979 | Mendelsohn . |
| 4,140,216 | 2/1979 | Conrad .............. 198/835 |
| 4,284,409 | 8/1981 | Van Teslaar . |
| 4,439,173 | 3/1984 | Fokos . |
| 4,449,958 | 5/1984 | Conrad . |
| 4,545,778 | 10/1985 | Koivula . |
| 4,589,954 | 5/1986 | Hastem-Muller .............. 198/834 |
| 4,601,685 | 7/1986 | Delhaes . |
| 4,652,474 | 3/1987 | Kraus . |
| 4,685,557 | 8/1987 | Roinestad .............. 198/834 |
| 4,821,871 | 4/1989 | Herren .............. 198/843 |
| 4,837,064 | 6/1989 | Tschudin-Mahrer . |

*Primary Examiner*—Joseph E. Valenza
*Assistant Examiner*—Tuan N. Nguyen
*Attorney, Agent, or Firm*—Fitch, Even, Tabin & Flannery

[57] ABSTRACT

In one embodiment, the invention comprises at least one roller with a plurality of recesses in its peripheral surface, mounted on the drive and trailing assemblies of a conveyor system. The recesses of each roller are angularly disposed relative to the central axes of their respective drive or trailing assemblies and are sized to receive a portion of an endless conveyor belt contacting the rollers. The bottom and size walls of the recesses act against the engaged portion of the belt to propel the belt through the system, support the belt and maintain the belt in proper tracking alignment. The recesses are preferably distributed in circumferential rows about the periphery of the roller and, in multi-row rollers, in a parallel relation across the width of the roller. A method for estimating the optimum size and configuration of the rollers of the invention for helical woven wire endless belts is also provided.

28 Claims, 3 Drawing Sheets

DRIVE SYSTEM FOR ENDLESS BELT CONVEYORS WITH ROLLERS HAVING DRIVING, SUPPORTING AND ALIGNING FEATURES

FIELD OF THE INVENTION

The invention relates to systems for driving and guiding endless belt conveyors, particularly conveyor systems employing helical or spiral, woven wire endless conveyor belts.

BACKGROUND OF THE INVENTION

An endless belt conveyor system commonly includes the endless conveyor belt, an assembly for driving the belt at the one end of the system and a trailing assembly at the opposite end of the system to support and return the belt to the drive assembly The drive and trailing assemblies are typically positioned to maintain the belt under the proper operating tension and to provide some, usually limited, lateral guidance to maintain the belt in proper tracking alignment In some applications, additional intermediate assemblies may also be used to further guide and support the belt.

There are many factors that may adversely affect the operation of the driving and trailing assemblies, particularly in systems using metal belts and helical or spiral weave, woven wire belts These include the loading requirements of the system, the vertical and horizontal space allowed for the drive and trailing assemblies, the operational temperature of the system, the inclines or side loading areas in the system and the operational atmosphere of the system (i,e. corrosive conditions, damp conditions, large temperature extremes, etc.). The drive and trailing assemblies in such applications must also frequently operate at high speeds for extended periods without adverse effects on the belt tension, belt tracking or belt durability.

In many conveyor systems, the drive and trailing assemblies use a smooth rubber or friction surfaced pulley to engage and propel the belt through the system. These pulleys, however, usually lack the ability to positively engage the endless belt or ensure proper tracking of the belt, and thus are frequently prone to slippage and loss of drive efficiency, particularly when the above factors create a difficult operating environment Other systems use expensive, and sometimes difficult to maintain, direct drive chain links mounted on the sides of the belt to engage outboard drive sprockets. These systems may reduce belt slippage and increase drive efficiency under extreme operating conditions, but are often not cost effective for the conveyor system manufacturer or the end user.

Relatively expensive and difficult to manufacture toothed sprocket systems have also been used to provide a positive drive for endless belt conveyors. These sprocket systems commonly rely on a limited, single engagement point between the sprocket teeth and the belt. In conveyors subject to substantial temperature ranges and extremes, the differential of thermal expansion between the belt and sprocket frequently interferes with this limited engagement between the toothed sprocket and belt. As a result, such systems may be inefficient, cause mistracking of the belt and fail to provide the belt with sufficient lateral support.

In addition, toothed sprockets are typically operable in only one direction. Thus, it is difficult, if not impossible, to reverse the direction of travel of the endless belt in such systems without rearranging or reworking the sprockets and other major components of the system.

In applications with strict vertical space limitations, as in cooling chambers and other operations using staggered, stacked belts, it is frequently desirable for cost and technical reasons to use woven wire belts with the largest mesh size compatible with the products carried by the belts. When the size of the belt mesh is increased, however, it is usually necessary to increase the diameter of the pulleys used in the system. An estimate used for systems employing drive and trailing pulleys is that the required pulley diameter in inches is equal to 180 divided by the number of mesh openings per linear foot along the length of the belt.

In the case of a belt with 16 mesh openings per linear foot of length, for example, the expected diameter for the pulleys in the system would be at least 11.25 inches. However, the vertical space available for drive and trailing assemblies in staggered, stacked conveyor systems often cannot accommodate pulleys of such sizes. Pulleys with smaller diameters may be used, but this often creates deleterious belt deformations as the belt passes over the pulleys These deformations may reduce the life of the belt and interfere with the belt alignment, particularly in high speed systems. Consequently, more costly, smaller mesh belts are frequently used in these applications, sometimes at the expense of the operating efficiency of the entire system.

The drive and trailing assemblies, in addition, are often required to maintain the conveyor belt at high tension levels without imposing significant strains on the structural elements of the belt. In some prior art systems, including those using multiple toothed sprockets, the drive and trailing assemblies failed to provide sufficient lateral support to the belt under high belt tension conditions, and in some instances increased the stresses and strains on the belt. In those systems, the belts intermittently dished, stretched, warped or curled during operation of the conveyor system. As a result, the belts were damaged before full scale use of the system commenced, the useful life of the belt and other components of the system were significantly curtailed, and the overall maintenance costs for the system were significantly increased.

The drive and trailing assemblies, furthermore, should be relatively easy to install and maintain Drive assemblies requiring multiple and complicated components that require extensive startup efforts and further close attention during operation of the system add substantial, undesirable expense to the overall cost of such systems. Similarly, the drive and trailing assemblies must be cost effective to purchase and include components that are durable and replaceable at a reasonable cost to the original system manufacturer and to the end user.

This invention overcomes the limitations of the prior art to provide an efficient, cost effective conveyor drive system, particularly for systems employing woven wire endless belts. The drive and trailing assemblies (as well as intermediate assemblies) of the invention provide a positive drive for endless belt conveyor systems that supports and maintains the belt in proper tracking alignment, is reversible and prevents undue stress on the belt members during high speed at high tension operations. This invention further provides a drive that is space efficient, suited for different operating conditions, including large temperature extremes and is very flexible in construction and use.

SUMMARY OF THE INVENTION

It is an object of the invention to provide a drive for endless belt conveyor systems that efficiently, supports and advances the endless belt through the conveyor system and aids in maintaining the belt in proper tracking alignment.

It is a further object of the invention to provide a device for an endless belt conveyor system that positively engages the endless belt, is reversible and efficiently advances and supports the belt through the system.

It is also an object of the invention to provide a drive for endless conveyor belt systems that operates effectively and efficiently in a variety of operating conditions, including in systems with relatively high belt loads, temperature ranges and variations, restricted space limitations, side loading, inclines and the like.

It is another object of the invention to provide a drive for endless conveyor belt systems that preserves the structural integrity of the belt, that is easily maintained and that includes replaceable, flexible and relatively inexpensive components.

It is another object of the invention to provide a method for estimating the optimum size and configuration of rollers for the drive and trailing assemblies of the invention.

Further and additional objects will be apparent from the following description, drawings and claims In one embodiment, the invention comprises at least one, and preferably a plurality, of slotted rollers mounted on the drive and trailing assemblies of a conveyor system. The slots on each roller are angularly disposed relative to the central axes of their respective drive or trailing assemblies and are sized to receive within the slot a portion of the belt contacting the rollers. The slot bottom and side walls act against the engaged portion of the belt to propel the belt through the system, support the belt and maintain the belt in proper tracking alignment.

The drive rollers are preferably mounted on a powered, rotatable drive shaft, and the trailing rollers are preferably mounted on a free-turning trailing shaft. In some embodiments, additional intermediate assemblies of support shafts and rollers disposed between the drive and trailing assemblies may also be used, and may include take-up rolls and the like.

Each roller, whether for the drive, trailing or intermediate assemblies, preferably comprises a cylindrical body made of a polymeric material such as ultra-high molecular weight polyethylene or other tough, durable polymers, carbon steel, stainless steels, in some applications woods and rubbers, and other similar materials or combinations of such materials The rollers may be machined, cast or molded depending on the application and material used.

The roller engagement slots are preferably distributed in circumferential rows about the periphery of the roller and, in multi-row rollers, in a parallel relation across the width of the roller. The engagement slots may be generally square in cross-sectional shape with a flat bottom wall and upwardly extending walls. Alternatively, the slots may include a curved or radiused bottom wall, or a V-shaped or tapered bottom wall. In the preferred embodiment, rollers with slots of different shapes and dimensions may be used in combination depending on their location in the conveyor system and the operational conditions of the system. The rollers also preferably include a set screw well extending through the roller so that an optional set screw may be threaded into the well to fix the roller in place on the drive, trailing or intermediate shafts.

In the preferred embodiment for helical, woven wire belts, a combination of multi-row rollers and single-row rollers are used on the drive, trailing and, if applicable, intermediate shafts. In this embodiment, the engagement slots of the rollers are symmetrically disposed about the peripheral surface of the rollers so that the direction of travel of the belt may be reversed without rearranging or rebuilding the drive, tracking or intermediate assemblies. The drive, trailing and intermediate shafts may also be of identical dimensions and the rollers for each may be interchangeable.

One method for estimating the optimum size and configuration of the rollers of the invention for helical woven wire endless belts comprises the following steps: (1) determining the belt mesh chordal pitch; (2) estimating the number of sides of a polygon encompassed by the proposed roller, where the chordal pitch of the polygon is compatible with that of the endless belt; (3) estimating the outer diameter of a cylinder circumscribing the polygonal cylinder; (4) estimating the chordal pitch of the roller; and (5) estimating the overall outer diameter of the roller.

The invention, in addition, is not limited to the above-recited embodiments or to use with woven or flat wire endless belts. Rather it includes the further embodiments discussed and shown below in the drawings, description and claims, and their equivalents

DETAILED DESCRIPTION OF THE INVENTION

For a more complete understanding of the invention, reference should be made to the drawings wherein.

Figure 1:
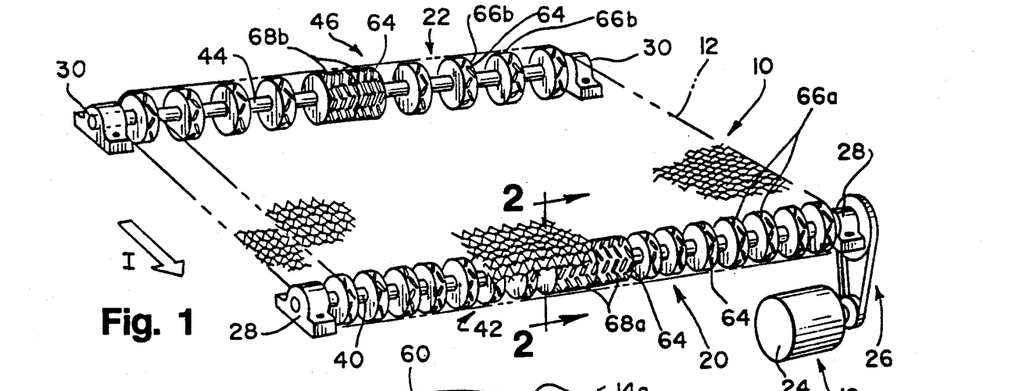
FIG. 1 is a perspective view of a conveyor system, with parts omitted for simplification and clarity, for a helical, woven wire endless belt employing the claimed invention and including drive and trailing assemblies.
Figure 2:
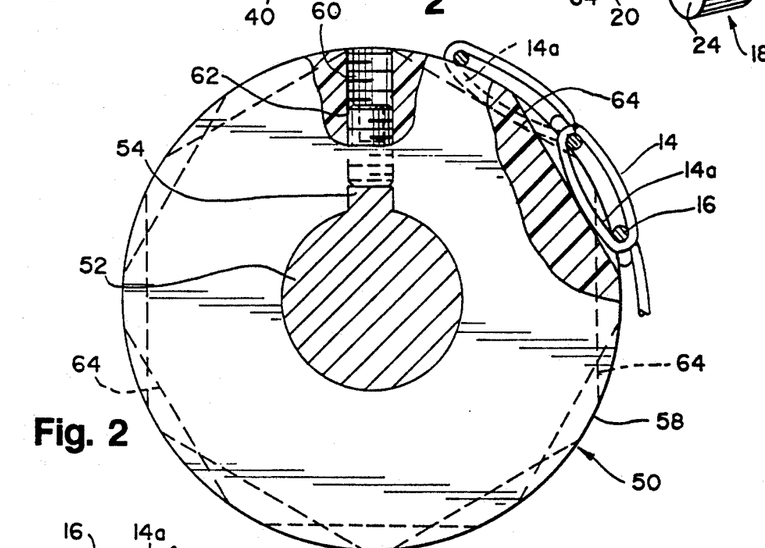
FIG. 2 is a side elevational view of the roller shown in FIG. 1 with fragmentary sectional views of portions of the roller and with a partial section of a helical woven wire endless belt shown.
Figures 3, 4:
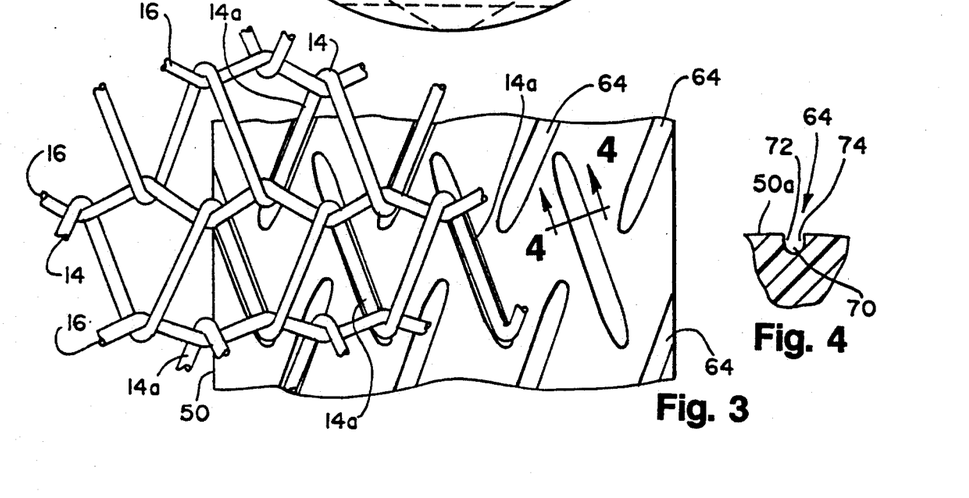
FIG. 3 is a fragmentary plan view of the roller shown in FIG. 2 with a partial section of helical, woven wire endless belt shown
FIG. 4 is a sectional view of one of the slots of the roller shown in FIG. 3 through the line 4—4.

Referring now to the drawings, and more particularly to FIGS. 1-3, one embodiment of the invention 10 is shown in FIG. 1 adapted for use with a conveyor system employing a helical, woven wire endless belt 12 with a belt travel path I. As shown in FIGS. 2 and 3, such helical, woven wire belts are commonly made of a series of one or more helically wound wires 14 connected by splice wires 16. The belt may be formed, as shown in FIGS. 1-3, to include a balanced series of alternating right-hand and left-hand helical wires 14 joined by crimped splice wires 16, as well as other configurations including semi-closed weaves, double weaves, and compound weaves, with crimped or straight splice wires. Similarly, the invention may be adapted for use with belts of differing constructions such as wire belts with exposed helical or other protruding substructures.

The dimensions of helical woven wire belts, such as that shown in FIGS. 1-3, are commonly described by a three number code such as 18-16-16. The first number (18) designates the helical openings per foot along the width of the belt. The second number (16) designates the helicals (and splices) per foot along the length of the belt. The third number (16) indicates the gauge or diameter of the wire used in the belt. When the splice wire is of a different diameter than the helical wire, an additional number indicating the gauge of the splice wire may be included between the second and third numbers. In the above belt with a 14 gauge splice wire, the belt designation would be 18-16-14-16.

As shown in FIG. 1, the conveyor system for the helical woven wire belt of the Figures includes a drive or power source 18, operatively connected to a drive assembly 20 for advancing the belt 12 through the system and a trailing assembly 22 for supporting and returning the belt 12 to the drive assembly 20. The invention, however, is not limited to that particular system and configuration.

As shown in FIG. 1, the power source 18 may include a drive motor 24, such as an electric motor, hydraulic system, or other such drive sources known to those skilled in the art. The drive motor 24 rotates the drive assembly 20 through a transmission 26, such as the belt and pulley system shown in FIG. 1, a chain and sprocket system, a gear box or other power transmission systems known to those skilled in the art.

The drive assembly 20 is mounted on bearing supports 28 disposed at the outboard ends of the drive assembly 20. The bearing supports 28 may be of various configurations known to the art, and the specific bearing supports 28 used will depend on the operating environment and requirements of the particular conveyor system.

In the embodiment shown in FIG. 1, the drive assembly 20 engages and propels the endless belt 12 around the trailing assembly 22 located opposite the drive assembly 20. The trailing assembly 22 is typically unpowered and serves to support, align and return the belt 12 to the drive assembly 20. The trailing assembly 22 is also mounted on bearing supports 30 similar to, or the same as, the drive bearing supports 26.

The drive 20 and trailing 22 assemblies, in addition, are spaced to ensure that the belt 12 remains under sufficient tension to properly engage the drive 20 and trailing 22 assemblies and to prevent undesirable contact between the belt 12 and other components of the system or other nearby conveyor systems and machinery. Intermediate assemblies, such as take-up rolls, may also be used to maintain the proper belt tension. The needs and uses of a particular system will determine the amount of belt tension required. The invention 10 may be used in a high belt tension systems when it is necessary to conserve space and to adequately support the goods carried by the belt 12. The invention 10 may also be used with intermediate or low belt tension systems.

As shown in FIG. 1, the drive assembly 20 preferably includes at least one rotatable drive shaft 40 linked to the transmission system 26. A series of drive rollers 42 are spaced along the length of the drive shaft 40. Similarly, the trailing assembly 22 preferably includes at least one unpowered, freely rotatable trailing shaft 44 and trailing rollers 46 spaced along the length of the trailing shaft 44. In some circumstances and configurations, it may also be desirable to employ multiple driving, trailing or intermediate shafts with accompanying rollers. The degree of cooperation between the assemblies, their configuration and their disposition in such systems will depend on the particular application.

In the preferred embodiment, the drive and trailing shafts 40 and 44 are made of tough, durable materials such as carbon steels or stainless steels, although other materials may be used. The drive 42 and trailing rollers 46 are preferably made of ultra-high molecular weight polyethylene or another tough durable material such as carbon steel, iron, stainless steel, polymeric materials, etc., and in some applications, woods, rubbers or combinations of the above-mentioned materials.

The drive and trailing rollers 42 and 46 may be machined from solid stock, tube or extruded materials, or they may be molded or cast from other suitable materials. The particular materials used for the shafts 40 and 44 and the rollers 42 and 46 will depend on the specific application of the invention and the specific operating conditions. In most applications, the drive 42 and trailing 46 rollers are preferably of similar construction.

A sectional view of a roller 50 suitable for use as a drive 40 or a trailing 42 roller is shown in FIG. 2. The roller 50 is preferably provided with a central bore 52 with a keyway 54 disposed to receive a key flange of the drive or trailing shafts 40 or 44. The central bore 52 is preferably sized to permit the slidable movement of the roller 50 along the length of the shafts 40 or 44. With this arrangement, the roller 50 may be easily positioned, removed or replaced on the shafts 40 or 44 depending on the system requirements.

The roller 50 is also preferably provided with a radially extending set screw well 60 in communication with the keyway 54. This well 60 is threaded to receive a set screw 62 to lock the roller 50 in place on the shafts 40 or 44. The set screw 62 is optional in applications where it may be desirable to allow the lateral movement of the roller 50 during operation of the conveyor system. The movement of the roller 50 may also be laterally restrained with welds, clips, stops, locking members or other equivalent means.

As shown in FIGS. 1-4, the roller 50 is further provided with a plurality of engagement recesses, such as engagement slots 64 or similar structures These recesses or slots 64, are arranged in at least one circumferential row about the periphery of the roller 50. As shown in FIGS. 2 and 3, the slots 64 are preferably spaced at regular intervals around the periphery of the roller 40. As shown in the alternative embodiment of the roller 150 depicted in FIG. 5, the peripheral spacing of the slots may be varied and will depend on the specific belt 12 used and, in the case of helical woven wire belts, the size of the belt mesh openings As shown in FIGS. 1 and 3, the width of the roller 50 may be limited to that required for only a portion or all of a single circumferential row of slots 64, or may accommodate a plurality of juxtaposed circumferential rows of engagement slots 64, with the slots 64 of each row in a parallel relation to the slots 64 of the adjacent rows. In FIG. 1, the preferred drive assembly 20 for a helical, woven wire belt includes a series of fourteen single row drive rollers 66a spaced on each side of a pair of multi-row drive rollers 68a, here with four rows of slots 64. In the preferred embodiment, the four-row drive rollers 68a are locked in a side by side, abutting relation and the seven single-row rollers 66a are locked in an evenly spaced relation on either side of the pair of four row rollers 68a across the remaining width of the belt.

The number of rollers, the number of circumferential rows of slots per roller, and the spacing of multiple rollers (when used) will depend on the particular application. As shown in FIG. 1, it may be preferable to place the wider, multi-row drive rollers 68a in a central location on the drive shaft 40 to support the center of the belt 12 and maximize the available drive force transferable from the drive assembly 20. The single-row rollers 66a on either side of the multi-row rollers 68a support the belt 12, maintain the belt 12 in proper tracking alignment and aid in driving the belt 12. Other configurations include, for example, combinations of one or more multi-row driver rollers 68a spanning all or part of the length of the drive shaft 40 as a series of single-row rollers 66a spaced across the length of the drive shaft 40.

Similar considerations apply to the trailing assembly 22. As shown in FIG. 1, the trailing shaft 44 adapted for use with the helical woven wire belt supports two centrally located multi-row rollers 68b, here with four rows, and four single-row rollers 66b on either side of the multi-row rollers 68b. The trailing assembly 22 may also employ other combinations of rollers, such as multi-row rollers 68b spanning all or a part of the trailing shaft 44 or a series of single row rollers 66b spaced along the trailing shaft 44. The trailing assembly 22 supports and aligns the belt 12 and may, in some applications, incorporate drive motors or the like to transmit or further propel the belt 12 through the conveyor system.

In systems with large temperature ranges or extremes, it is often preferable to employ spaced single row rollers 66 with a width correlated to the coefficients of thermal expansion of the belt 12 and the rollers 50, or spaced combinations of such single row rollers 66 and multi-row rollers 68 on both the drive 20 and trailing 22 assemblies. With such an arrangement, the engagement between the roller slots and belt helicals 14, discussed below, is maintained and the effect of differences in thermal expansion rates between the rollers 66 and 68 and the belts is reduced, particularly in systems where the differences in thermal expansion ratios of the rollers and the belt is significant.

As shown in the Figures, particularly 3, 6 and 10, the slots 64 are preferably spaced, and disposed at an angle relative to the direction of travel I of the belt 12. The spacing and angles of the slots 64 correspond to the portions or elements of the endless belt 12 that engage the roller 50. As shown in FIG. 3, the engagement slots 64 of the roller 50 are disposed at an angle corresponding to the angle of the helical sections 14 of the woven wire belt 12, and are spaced to receive the lower portions 14a within the slots 64. As shown in FIGS. 2 and 3, the slots 64 in the preferred embodiment are also symmetrically spaced laterally along, and circumferentially about, the periphery of the roller 50 to correspond to the spacing of the helical sections 14 of the belt 12.

This placement of symmetrical slots 64 in a uniform and symmetrical pattern in the preferred embodiment, and the slot dimensions mentioned below, permits the reversible operation of the roller 50. Unlike prior toothed sprocket systems, systems employing the rollers 50 of the invention may be operated in either a forward or reversed belt travel direction without substantial modification of the system.

As shown in FIG. 4, the slots 64 comprise a bottom wall 70 connecting first 72 and second 74 parallel spaced, upwardly extending side walls. In the preferred embodiment, the side wall spacing is approximately twice the gauge of the helical wire 14. This spacing allows for some variance in the placement of the helical sections 14 of the belt 12 within the slot 64 during operation of the system and compensates for differing thermal expansion rates between the belt 12 and roller 50. The width of the slot opening also allows use of belts with somewhat differing configurations and gauge with a common roller configuration and design.

In the preferred embodiment for helical woven wire belt systems, the slot bottom wall 70 is spaced a sufficient distance from the outer peripheral surface 50a of the roller 50 to accommodate the full lower portion 14a of a turn or "loop" of the helical wire 14. The walls are angularly disposed to match the pitch of the helix loops of the wire 14 and thereby provide an angular linear engagement. Generally, this will approximate, but be less than one-half of the vertical height of the helix loops. In other systems, more or less of the portion of the belt engaged by the slots 64 will be disposed within the slots 64.

Figure 9:
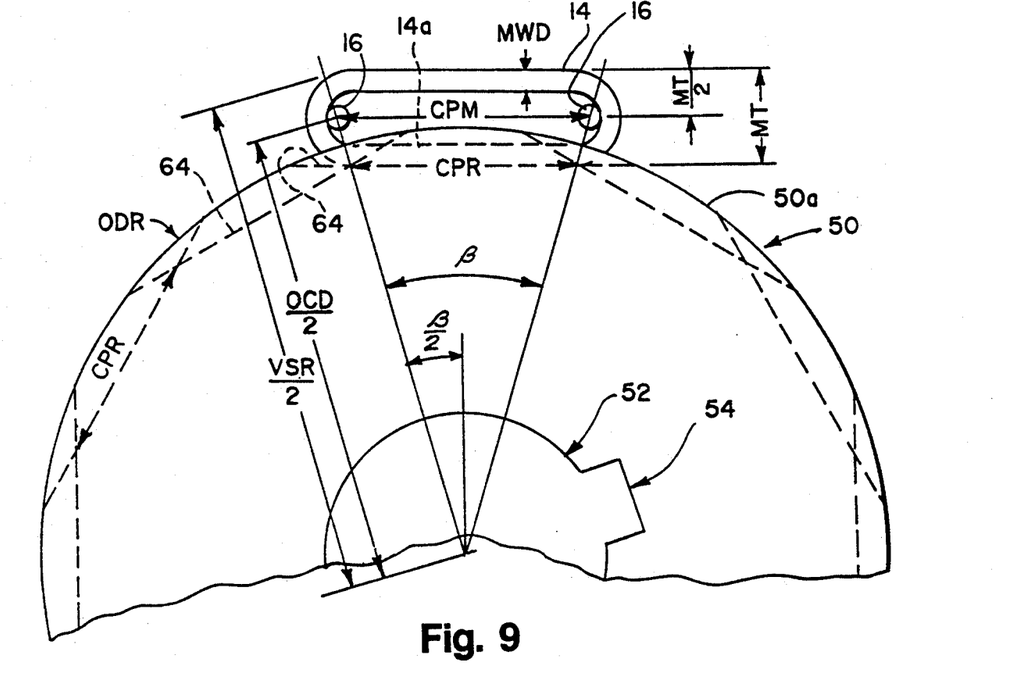
FIG. 9 is an expanded fragmentary side elevational view of a portion of a roller, such as that shown in FIG. 2, describing the dimensions used to estimate the optimum configuration of the roller.

In many applications, as shown in FIG. 9, particularly for woven wire mesh belt systems, the bottom walls 70 of the slots 64 can be viewed as falling along a series of chordal planes defining a cylindrical regular polygon encompassed by the outer periphery of the roller 50. Each bottom wall 70 of the roller 50 can be viewed as falling along one chordal engagement surface of the polygon. Thus, the roller 50 of FIG. 2, with 12 slots, encompasses a 12 sided polygon with 12 chordal engagement surfaces.

Figure 7:
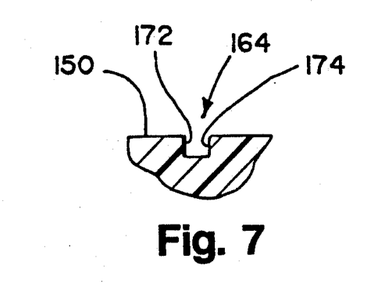
FIG. 7 is a sectional view of an alternative embodiment of a roller slot such as may be used in the roller of FIG. 6 through the line 7—7.
Figure 8:
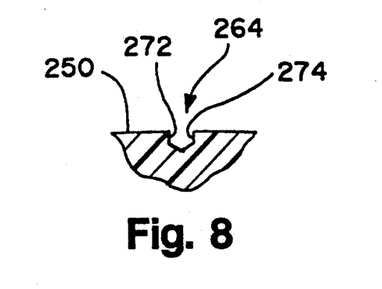
FIG. 8 is a sectional view of another alternative embodiment of a slot for rollers such as those shown in FIGS. 3 and 6.

As shown in FIGS. 2 and 3, the slots 64, in addition, preferably extend along the peripheral surface of the roller 38 at least a sufficient distance to accommodate the maximum length of the bottom portion 14a of the helix loops within the slots 64. This distance will depend on the chordal length of the helix loops, the belt type, dimensions and gauge, the method used to fabricate the roller, and the particular application The slots may be of the same length, of differing lengths, or combinations of lengths As shown in FIGS. 4, 7 and 8, the configuration of the slot 64 may also be varied for differing applications. In FIG. 4, the bottom wall 70 is curved or radiused In another embodiment shown in FIG. 7, the bottom wall 170 is planar with upwardly extending side walls 172 and 174 normal to the bottom wall 170. In a third embodiment shown in FIG. 8, the bottom wall 270 is V-shaped or tapered, with upwardly extending side walls 272 and 274.

The radiused and tapered slot configurations shown in FIGS. 4 and 7 provide optimal centering of the helix loops of the belt 12 within the slots 64 to maintain the belt 12 in proper tracking alignment during operation of the system. The square configuration shown in FIG. 7, does not center the helical sections 14 as effectively, but allows a wider tolerance for twisting or wavering of the helix loops of the belt 12 within the slots 64 and for differing thermal expansion rates between the roller 50 and belt 12.

In the preferred embodiment of the invention shown in FIG. 1, as adapted for a low belt tension system, the single-row 66a drive rollers, the multi-row 68a drive rollers and the single-row trailing rollers 66b were provided with radiused slots such as those shown in FIG. 4 to enhance the drive and tracking functions of the drive and trailing assemblies 20 and 22. The multi-row trailing rollers 68b were provided with square slots such as those shown in FIG. 7 to enhance the support functions of the trailing assembly 22.

Figure 5:
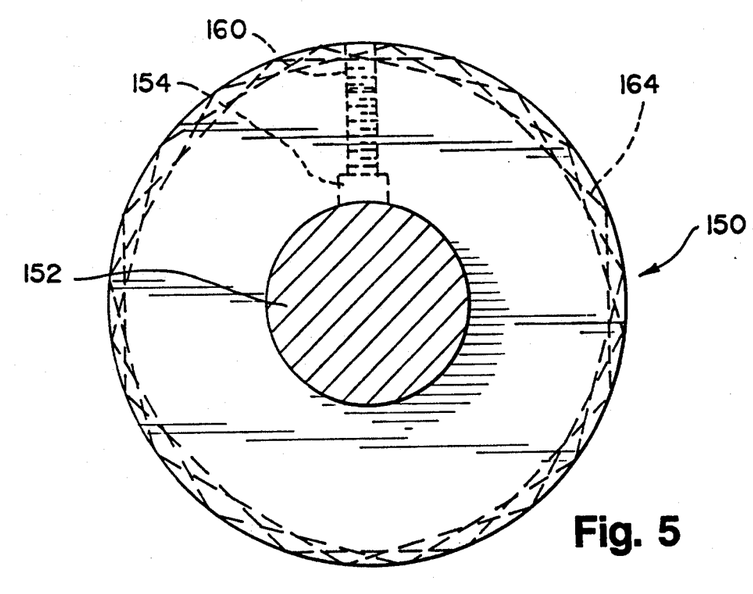
FIG. 5 is a side elevational view of an alternative embodiment of a roller, such as that shown in FIG. 2, adapted for a helical woven wire endless belt with smaller mesh openings
Figure 6:
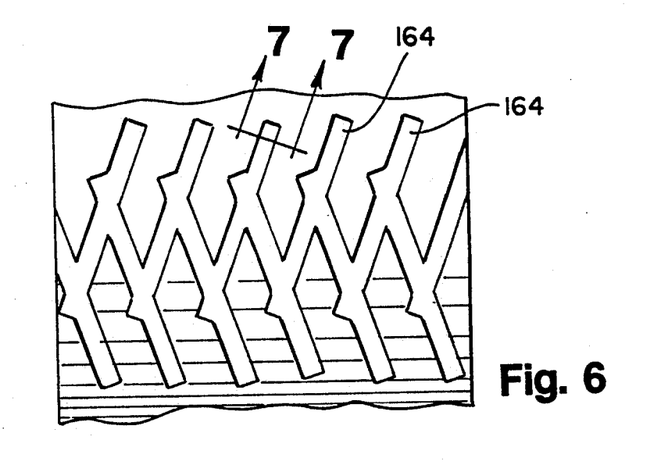
FIG. 6 is a fragmentary plan view of the roller shown in FIG. 5.

An alternative embodiment of a roller suitable for use in a drive 20 or trailing 22 assembly is shown in FIGS. 5 and 6. This multi-slot roller 150 is also provided with a central bore 152, keyway 154 and set screw well 160 each adapted for mounting the roller 150 on a drive shaft 40 or trailing shaft 44 as discussed above. The slots 164 of this embodiment are circumferentially and laterally disposed to engage a helical, woven wire belt with smaller mesh openings, and thus more closely spaced helix loops than the embodiment shown in FIGS. 1-3.

As shown in FIGS. 1-3, in operation with a helical, woven wire endless belt 12, the drive and trailing assemblies 20 and 22 are spaced to put the belt 12 under sufficient tension to ensure firm engagement between the belt 12 and the drive and trailing rollers 42 and 46. As the belt 12 wraps around and passes over the drive rollers 42, a plurality of helix loops are received within a corresponding slots 64 on the drive rollers 42. The forward rotation of the drive rollers 42 causes the bottom walls 70 and one or both of the side walls 72 and 74 of each slot 64 to contact and propel forward the helix loops, and thus the belt 12, within the system.

The angled disposition of slots 64 relative to the direction of travel of the belt 12 and the engagement of multiple helix loops of the belt 12 by the slots 64 provides substantial engagement between the helix loops and the rollers 42 and 46 to efficiently transfer the rotational movement of the rollers 42 and 46 to the belt 46. The angled slots 64 further tend to restrain the lateral motion of the belt 12 across the rollers 64 and to prevent, or correct, any tracking misalignment of the belt 12 during operation of the system.

The multi-row drive rollers 66a support the center of the belt 12 and contribute substantially to the drive and aligning action provided by the drive assembly 20. The single row drive rollers 66b, and their respective slots 64, on either side of the multi-row rollers 66a further support the belt 12 along its width to prevent the belt 12 from sagging and the edges of the belt 12 from curling due to unequal distribution of the belt weight and tension over the drive assembly 20. The single row drive rollers 66a also contribute to the drive and self-aligning action provided by the drive assembly 20.

As the belt 12 passes over the trailing rollers 46 to return to the belt to the drive rollers 42, the belt helix loops also fall within the slots 64 of the trailing rollers 46. The trailing rollers 46, like the drive rollers 42, act to support the belt 12 and to maintain the belt 12 in proper alignment. When the trailing rollers 46 are locked in place, the slot bottom walls 70, side walls 72 and 74 of the trailing rollers 46 collectively urge the helix loops, and thus the belt 12, into the proper tracking position relative to the other components of the conveyor system. The multi-row trailing rollers 68b support and align the center of the belt 12, and the single row trailing rollers 68a support and align the belt 12 across the width of the belt 12.

While not shown in the drawings, intermediate assemblies using rollers, and combinations of rollers, as shown in FIGS. 1-8 may also be used to support and guide the belt during its travel between the drive and trailing assemblies 32 and 36. Such assemblies may employ rollers of a similar configuration as the drive and trailing assemblies 20 and 22 or may be tailored for specific applications. Similarly, the number, type and arrangement of the rollers for such intermediate assemblies may also be adapted for the particular conveyor system and operating conditions.

Method For Estimating Roller Configuration

In designing rollers suitable for use in systems using helical woven wire belts, such as those shown in FIGS. 1-8, a number of factors could be taken into consideration. These include the optimum outer diameter of the roller in view of the space available in the specific system, the chordal pitch of the belt, the horizontal pitch of the belt (mesh or helix loop count across the width of the belt), the mesh or helix loop height (the thickness of the belt), the mesh wire gauge diameter, and the pitch angle of the helix loops. Other considerations may include the belt load and speed requirements, the smoothness of travel of the belt over the rollers (particularly along the pass line), the belt travel requirements and the power available to the system.

Figure 10:
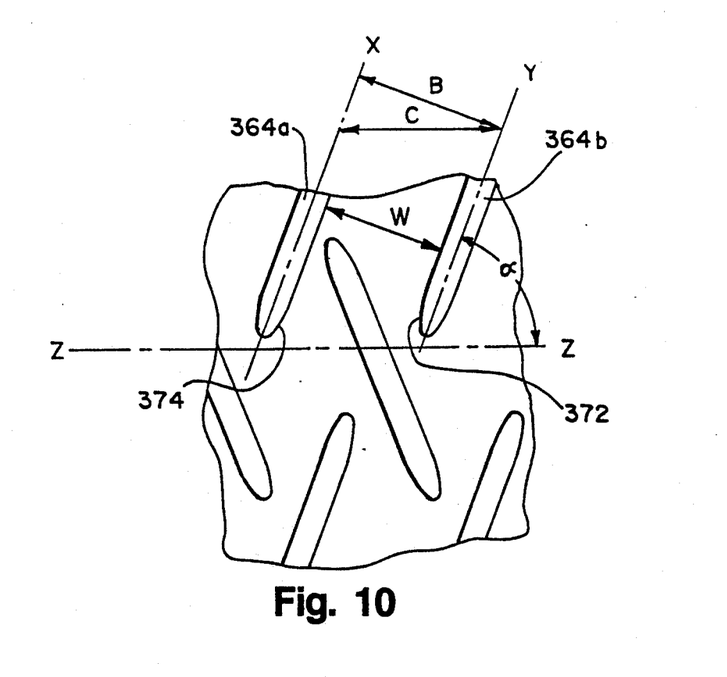
FIG. 10 is an expanded fragmentary plan view of a portion of the roller shown in FIG. 3 noting dimensions used to estimate the proper slot spacing on multi-row rollers.

For many such systems, the minimum vertical space required by the combination of rollers and belt may be estimated using calculations based on the belt dimensions. As shown in FIG. 9, these estimates use the chordal pitch and the mesh thickness of the belt to estimate the maximum number of sides of the cylindrical polygon encompassed by the roller mentioned above The dimensions of this polygonal cylinder and those of the belt are then used to determine the optimum outer diameter of the drive roller and the slot depth These estimates may then be used to confirm the minimum vertical space required by the rollers and belt in combination The angle of the slots of the rollers are estimated by direct measurement of the belt. In the case of helical woven wire belts, this measured angle will generally be less than expected due to the twist in the helix loops as shown in FIG. 3. As shown in FIG. 10, the minimum distance between the slots is estimated from the slot angle and the slot opening width.

These estimates may then be confirmed by actual prototypes. Where necessary, the dimensions and the configurations of the prototype rollers may be adjusted to best suit the particular conveyor system and operating conditions.

Example Of A Calculated Estimate Of The Optimum Roller Diameter

One embodiment of the invention was designed for an 18-16-16 endless belt, with a mesh or helix loop helical thickness of 300 inches. The available vertical space (VS) for the roller and belt combination was assumed to be 3.250 inches. An estimate of the diameter of a prior art pulley for such a belt is 180°/16 (the helicals per foot along the length of the belt) or 11.25 inches, which exceeds the available vertical space. Using the method described below, the rollers of the invention were found to have an estimated outer diameter of 2.749 inches and require only approximately 3.209 inches of vertical space which is well within the system requirements.

With reference to FIG. 9, the first step in estimating the dimensions of the rollers is to determine the belt mesh chordal pitch (CPM) using the following calculation:

$$CPM = 12 \text{ inches}/LP \tag{1}$$

CPM = The mesh chordal pitch, or length from one central axis of the splice wires connecting the belt helix loops to that of the next splice wire along the length of the belt LP = The linear pitch or number of helix loops per linear foot along the length of the belt (the second number of the belt designation)

In the example, the belt mesh chordal pitch (CPM) of the 18-16-16 belt is determined as follows:

$$CPM = 12 \text{ inches}/16 = 0.75 \text{ inches} \tag{1}$$

Next, the dimensions and central angles ($\beta$) of the polygonal cylinder encompassed by the proposed roller (as mentioned above) are estimated from a series of trial calculations using the mesh chordal pitch (CPM), the mesh or helix loop thickness (MT) and the maximum vertical space (VSR) allowable for the proposed roller. These dimensions are used to calculate the trial chordal pitch (TCP) of a series of trial polygonal cylinders with differing numbers of sides and differing central angles ($\beta'$) using the formula below. The trial polygonal cylinder with a trial chordal pitch (TCP) most closely approaching, but not less than, the belt mesh chordal pitch (CPM) is the polygonal cylinder with the optimum number of sides and the optimum central angles ($\beta$) for the proposed roller.

$$TCP = \frac{VS - [\text{secant}(1/2\beta') \times MT]}{\text{cosecant}(1/2\beta')} \tag{2}$$

TCP = chordal pitch of the trial polygonal cylinder
VS = maximum vertical space allowable for the proposed roller with 180° of belt wrapped around the roller
MT = mesh thickness
$\beta'$ = trial central angles of the trial polygonal cylinder The trial central angles $\beta'$ of the trial polygonal cylinder are determined by the following 0 formula; the secant and cosecant values of $\frac{1}{2}\beta'$ can be found in trigonometric tables:

$$\beta' = 360°/TNS \tag{3}$$

TNS = number of sides of the trial polygonal cylinder

As shown below, the trial chordal pitches (TCP) of trial polygonal cylinders with 11, 12 and 13 sides are calculated to determine the maximum number of sides of the polygonal cylinders encompassed by the proposed roller in view of the mesh chordal pitch (CPM) of the belt (as calculated above):

| No. Of Trial Polygon Sides | Chordal Pitch of Trial Polygon |
|---|---|
| 11 sides ($\beta' = 32.727°$) | $TCP = \frac{3.25 - (1.0422 \times .300)}{3.5494} = .827$ in. (2) |
| 12 sides ($\beta' = 30°$) | $TCP = \frac{3.25 - (1.0353 \times .300)}{3.8637} = .761$ in. (2) |
| 13 sides ($\beta' = 27.692°$) | $TCP = \frac{3.25 - (1.0299 \times .300)}{4.1785} = .704$ in. (2) |

The trial chordal pitch (TCP) for the 12 sided polygonal cylinder of 0.761 inches is closest to, but not less than the mesh chordal pitch (CPM) of 0.75 inches for the woven wire belt of the example. Thus, the best polygonal cylinder to estimate the optimum diameter of the proposed roller for the 18-16-16 belt is the 12 sided polygonal cylinder with central angles ($\beta$) of 30°.

Then, the outer diameter (OCD) of a cylinder circumscribing the polygonal cylinder derived from the above calculations is estimated with the following calculations:

$$OCR = CPM \div [\text{sine}(\tfrac{1}{2} \times 360°/N) \times 2] \tag{4}$$

$$OCD = 2 \times OCR \tag{5}$$

N = number of sides of the polygonal cylinder
OCR = radius of circumscribing cylinder
OCD = diameter of circumscribing cylinder In the example for the 18-16-16 belt, the outer diameter of the circumscribing cylinder (OCD) is calculated as follows:

$$OCR = .75 \div \left[\text{sine}\left(1/2 \times \frac{360°}{12}\right) \times 2\right] = 1.449 \text{ in.} \tag{4}$$

$$OCD = 2 \times 1.449 = 2.898 \text{ in.} \tag{5}$$

From the diameter of the circumscribing cylinder (OCD), above and the belt mesh thickness (MT), the chordal pitch of the proposed roller (CPR) is estimated with the following calculation:

$$CPR = \tag{6}$$

$$\left[\frac{OCD}{2} - \left(\frac{MT}{2} \times \text{secant}(1/2\beta)\right)\right] \times [\text{sine}(1/2\beta) \times 2]$$

CPR = chordal pitch of the proposed roller

In the example for the 18-16-16 belt, the CPR is calculated as follows:

$$CPR = [1.449 - (0.15 \times 1.0353)] \times 0.5176 = 0.6696 \text{ in.} \tag{6}$$

Next, the optimum overall outer diameter of the roller (ODR) is estimated with the following formula:

$$ODR = 2 \times \left[ \left( \frac{CPR}{2} \div \tan(1/2\beta) \right) + (2 \times MWD) \right] \quad (7)$$

ODR = Overall outer diameter of the roller
MWD = The approximate diameter or gauge of the wire of the helical mesh, adjusted to allow clearance in the ODR for the helical splice wires The optimum overall outer diameter of the roller for the example is estimated as shown below. The belt mesh wire diameter (MWD) for the 16 gauge wire used in the 18-16-16 belt is 0.0625 inches.

$$ODR = 2\ (1.2494 + 0.125) = 2.749\ inches \quad (7)$$

The vertical space (VSR) required for the proposed roller, in combination with 180° of belt wrapped around the roller, may be confirmed using the central angle ($\beta$) of the roller, chordal pitch of the belt mesh (CPM) and mesh thickness (MT) with the following estimate:

$$VSR = [CPM \times (cosecant(\tfrac{1}{2}\beta))] + [MT \times secant\ (\tfrac{1}{2}\beta)] \quad (8)$$

VSR = Vertical space of the roller with 180° of belt
For the proposed roller of the example, the estimated vertical space of the roller and belt combination (VSR) is as follows:

$$VSR = (0.75 \times 3.8637) + (0.300 \times 1.0353) = 3.209\ in. \quad (8)$$

The available space for the roller and belt assembly was assumed to be 3.250 inches. Thus, the above calculation confirms that the estimated dimensions of the roller in the example satisfy the maximum vertical space requirements of that system.

Example Of Estimate Of Roller Engagement Slot Disposition And Dimensions

As discussed above, disposition of the engagement slots of the rollers may be estimated by measurements of the belt and by calculations based on those measurements. With helical woven wire belts, the angles of the engagement slots relative to the belt and drive shaft must be determined by protracting the actual helix loops. A rough calculation based on the mesh count of the belt may be used, but must be corrected to account for the twist in the helix loops.

For the example of an 18-16-16 belt, the slot angle calculated from the theoretical pitch angle of the helix loops as determined from the mesh count (16) is 23.94°. The actual pitch angle as measured on an Alloy Wire Belt Co. galvanized 1008 steel wire belt is 20°. Similarly, for a 36-36-17-18 belt, the theoretical helix loop pitch angle is 26.57°, while the actual pitch angle as measured on an Alloy Wire Belt Co. 304 stainless steel belt is 19°. Variations in the belt manufacture, belt materials, as well as the shape and disposition of the belt members may also affect this angle.

As discussed above, the width of the slot opening, i.e., the distance between the side walls 72 and 74 in FIG. 4, is preferably twice the wire gauge of the belt helix loops. In the example of an 18-16-16 belt, the preferred slot width for a 16 gauge wire belt (0.0625 inches) would be 0.125 inches from slot side wall 72 to side wall 74.

The spacing of the slots on multi-row rollers for a helical woven wire belt, such as in the example, is determined from the horizontal mesh count of the belt (HML) and the angle ($\alpha$) of the slot relative to the axis of the roller Z—Z. As shown in FIG. 10, the distance (C) between the center lines X and Y of slots 364a and 364b on a line parallel to the axis of rotation of the roller Z—Z is estimated by the following formula:

$$C = 12\ inches/HML \quad (9)$$

C = the distance between the center lines X and Y of the slots 364a and 364b on a line parallel to the axis of the rotation of the roller
HML = the horizontal mesh count, or helix loop count per foot along the width of the belt.

In the example of an 18-16-16 belt, the distance C is calculated as follows:

$$C = 12\ inches/18 = 0.667\ inches \quad (9)$$

As shown in FIG. 10, the distance between the center lines X and Y of the slots on a line perpendicular to the center lines is determined using the following formula:

$$B = (cosine\ \alpha) \times C \quad (10)$$

B = distance between the center lines X and Y, on a line perpendicular to the center lines.
$\alpha$ = is the slot angle corresponding to the actual pitch angle of the belt helix loops as discussed above.

In the example of an 18-16-16 belt, the measured helical angle for an Alloy Wire Belt Co. galvanized 1008 steel belt is 20° and B is calculated as follows:

$$B = (cosine\ 20°) \times 0.667 = 0.627\ on \quad (10)$$

As shown in FIG. 10, the space between the right side wall 372 of slot 364a and the left side wall 374 of slot 364b is estimated with the following formula:

$$W = B - SW \quad (11)$$

W = the distance between the right side wall of one slot and the left side wall of an adjacent slot.
SW = the slot width as discussed above.

In the example of an 18-16-16 belt, the distance between side walls of the slots W is calculated as follows:

$$W = 0.627 - 0.125 = 0.502\ inches \quad (11)$$

Thus, the invention provides a drive for endless belt conveyor systems that efficiently, supports and advances the endless belt while maintaining the belt in proper alignment without additional devices or guides. The drive of the invention is reversible, operates effectively in a variety of operating conditions, including systems with relatively high belt loads, temperature ranges and variations, restricted space limitations, side loading, inclines and the like.

The invention, in addition, provides a drive that is relatively simple and cost effective to manufacture. The invention further efficiently utilizes the available vertical space in conveyor systems to permit the use of belts with large wire mesh configurations. Thus, the invention provides significant cost savings to the end users, as well as to the original equipment manufacturers The invention also provides a drive for endless conveyor belt systems that is easily maintained and includes replacable, flexible and relatively inexpensive components.

While the invention has been described by reference to certain specific descriptions and examples which illustrate preferred material, configurations and conditions, it is understood that the invention is not limited thereto. Rather, all alternatives, modifications and equivalents within the scope and spirit of the invention so described are considered to be within the scope of the appended claims.

What is claimed is:

1. A drive for an endless conveyor belt having exposed, spaced segments at one surface of said belt comprising:
   at least one roller defining a generally cylindrical outer peripheral surface and having a central longitudinal axis about which said roller rotates in normal use;
   said roller including recesses in said peripheral surface to accommodate said belt segments therein, each of said recesses having an internal length;
   each of said recesses including at least one side wall means, and a bottom wall means defined by a longitudinal surface extending substantially said length of said recesses,
   said side wall means including at least one abutment surface disposed to engage said portion of said belt segment within said recesses and said longitudinal bottom wall surface disposed to engage and support said belt segment within said recesses;
   said abutment surfaces being of sufficient length and extending longitudinally at an acute angle to said longitudinal axis whereby said belt segment will be received in said recesses and engaged by said abutment surfaces in a supporting and centrally aligning relation when said conveyor belt is engaged on said roller.

2. The drive of claim 1 wherein said abutment surfaces being of sufficient length an extending longitudinally at an acute angle to said longitudinal axis whereby said belt segments will be received in said recesses and engaged by said abutment surfaces in a driving relation when said conveyor belt is engaged on said roller.

3. The drive of claim 1 wherein said recesses are symmetrically disposed about said peripheral surface of said roller in at least one circumferential row.

4. The drive of claim 1 wherein said roller are provided with a plurality of said rows of recesses; each of said recesses juxtaposed in a parallel relation.

5. The drive of claim 1 wherein said drive is used in variant ambient temperature conditions of a predetermined range and said belt having a coefficient of thermal expansion different from said roller; said roller means provided with said recesses symmetrically disposed about said peripheral surface of said roller in one circumferential row; said roller having a significant longitudinal width; and said width of said roller correlated to the coefficient of thermal expansion of said belt to maintain said engagement of said abutment surfaces with said belt segments received in said recesses throughout said predetermined temperature range.

6. The drive of claim 1 wherein said recesses comprise a plurality of slots disposed to accommodate said portion of said belt segment within said slots; said abutment surfaces of said recesses including bottom wall means and side wall means extending upwardly from said bottom wall means defining said slots; and said bottom wall means and side wall means are disposed to engaged said portion of said belt segment within said slots.

7. The device of claim 6 wherein said bottom wall means are tapered.

8. The device of claim 6 wherein said roller encompasses a cylindrical polygon with planar chordal surfaces extending parallel to said longitudinal axis of said roller; and said bottom wall means of said slot disposed along said chordal surfaces of said cylindrical polygon.

9. The drive of claim 1 wherein said recesses comprise a plurality of slots disposed to accommodate said portion of said belt segment within said slots; each of said slots having an internal length; said abutment surfaces of each said slot including at least one side wall means and a bottom wall means defined by a surface extending substantially said length of said slot; and said bottom wall means and side wall means disposed to engage said portion of said belt segment within said slot.

10. The drive of claim 9 wherein at least one surface extending the substantially said length of said slots defines said side wall means; said side wall means extending upwardly from said bottom wall means.

11. The drive of claim 1 wherein said recesses are circumferentially separated from each other by a continuous portion of said peripheral surface of said roller.

12. The drive of claim 1 wherein said recesses alternate about the periphery of said roller.

13. A drive for an endless conveyor belt having exposed, spaced segments at one surface of said belt comprising:
   drive means and trailing means, said trailing means disposed in an opposing relation to said drive means, each of said drive means and trailing means including at least one roller defining a generally cylindrical outer peripheral surface and having a central longitudinal axis about which said roller rotates in normal use;
   said roller including recesses in said peripheral surface to accommodate at least a portion of said belt segments therein, each of said recesses having an internal length and each of said recesses including at least one side wall means, and a bottom wall means defined by a longitudinal surface extending substantially said length of said recesses;
   said side wall means including at least one abutment surface disposed to engage said belt segment within said recesses and said longitudinal bottom wall surface disposed to engage and support said belt segment within the recesses;
   said abutment surfaces being of sufficient length and extending longitudinally at an acute angle to said longitudinal axis whereby said belt segment will be received in said recesses an engaged by said abutment surfaces in a supporting and centrally aligning relation when said conveyor belt is engaged on said roller; and
   said recesses spaced about said peripheral surface to correspond with said spacing of said belt segments when said conveyor belt is engaged on said roller.

14. The drive of claim 13 wherein said recesses are symmetrically disposed about said peripheral surface of said roller in at least one circumferential row.

15. The drive of claim 14 wherein said roller are provided with a plurality of said rows of recesses; each of said recesses juxtaposed in a parallel relation.

16. The drive of claim 13 wherein said drive means is provided with a greater number of roller than said trailing means.

17. The drive of claim 15 wherein said drive means includes at least one drive shaft means rotatably supporting said roller of said drive means; said trailing means includes trailing shaft means rotatably supporting said roller means of said trailing means; and said drive shaft means is operatively connected to means for rotating said drive shaft means.

18. The drive of claim 15 wherein said recesses comprise a plurality of slots disposed to accommodate said portion of said belt segments within said recesses.

19. The drive of claim 18 wherein said slots are symmetrically disposed about said peripheral surface of said roller in at least one circumferential row.

20. The drive of claim 19 wherein said drive means and said trailing means each include at least one centrally located roller provided with a plurality of said circumferential rows of said slots; said slot means of said circumferential rows juxtaposed in a parallel relation 21. The drive of claim 19 wherein each of said drive means and said trailing means are provided with a plurality of said multi-row roller disposed in a central, abutting relation on said drive means and said trailing means.

22. A roller for engaging an endless conveyor belt which includes exposed strand segments at one surface of said belt, which segments are spaced from one another and extend at acute angles to the length of the belt, said roller defining a generally cylindrical outer peripheral surface and having a central longitudinal axis about which said roller rotates in normal use, said roller including recesses having an internal length in said peripheral surface to accommodate said strand segments therein, each of said recesses having an abutment surface along at least one side thereof which abutment surface is of a height to abuttingly engage one of said strand segments received in the respective recesses, and each of said recesses having a bottom longitudinal surface extending substantially said length of said recesses, and each of said abutment surfaces height of significant length and extending longitudinally at said acute angle to said longitudinal axis, and said bottom longitudinal surface disposed to engage and support said strand segment within said recesses, whereby said strand segment will be received in said recesses and abut said abutment surfaces in drive relation when such a conveyor belt is engaged on said roller.

23. The invention of claim 22 wherein each of said recesses is a slot having generally parallel side walls which form such an abutment surface at each side of each of said recesses.

24. A method for determining the optimum configuration of a roller for a drive for a helical woven wire endless conveyor belt, said roller provided with at least one circumferential row of engagement slots for receiving and engaging a portion of said belt within said slots comprising the following steps:
(a) determining the belt mesh chordal pitch;
(b) determining the number of sides and central angles of cylindrical polygon having a chordal pitch most closely approaching, but exceeding the belt mesh chordal pitch;
(c) determining the optimum diameter of a cylinder circumscribing said cylindrical polygon;
determining the chordal pitch of the proposed roller mean from the estimated diameter of said circumscribing cylinder; and
(e) determining the optimum outer diameter of said roller from said chordal pitch of said roller that minimizes the vertical space required for said roller.

25. The method of claim 24 comprising the additional steps of:
(f) determining the slot angle a measurement of the pitch range of said helical woven wire belt;
(g) determining the width the slot opening in relation to the gauge of said helical woven wire belt; and
(h) determining the spacing of said slots in relation to the mesh count of said belt and the angle of pitch angle of said helical woven wire belt.

26. A drive for an endless conveyor belt having exposed, spaced segments a one surface of said belt comprising:
at least one roller defining a generally cylindrical outer peripheral surface and having a central longitudinal axis about which said roller rotates in normal use;
said roller including recesses in said peripheral surface to accommodate said belt segments therein, each of said recesses including at least one abutment surface disposed to engage said belt segment within said recesses;
said abutment surfaces being of sufficient length and extending longitudinally at an acute angle to said longitudinal axis whereby said belt segment will be received in said recesses and engaged by said abutment surfaces in a supporting and aligning relation when said conveyor belt is engaged on said roller;
said recesses comprising a plurality of slots disposed to accommodate said portion of said belt segment within said slots; said abutment surfaces of said recesses including bottom wall means and side wall means defining said slot, wherein said bottom wall means are radiused;
and said bottom wall means and side wall means are disposed to engaged said portion of said belt segment within said slot.

27. A drive for an endless conveyor belt having exposed, spaced segments at one surface of said belt comprising:
drive means and trailing means, said trailing means disposed in an opposing relation to said drive means, each of said drive means and trailing means including rollers defining a generally cylindrical outer peripheral surface and having a central longitudinal axis about which said rollers rotate in normal use;
said roller including a plurality of slots disposed to accommodate at least a portion of said belt segments within said slots, each of said slots including at least one abutment surface disposed to engage said portion of said belt segment within said slots;
said abutment surfaces being of sufficient length and extending longitudinally at an acute angle to said longitudinal axis whereby said belt segment will be received in said recesses and engaged by said abutment surfaces in a supporting and aligning relation when said conveyor belt is engaged on said roller;
said drive means said trailing means each include at least one centrally located roller provided with a plurality of said circumferential rows of said slots, said circumferential rows juxtaposed in a parallel relation; and
said drive means and trailing means also include a plurality of rollers provided with a single circumferential row of said slots; said single-row rollers disposed in a spaced relation on either side of said multi-row rollers.

28. The drive of claim 27 wherein said drive means is provided with a greater number of said single-row rollers than is said trailing means.

* * * * *